(12) United States Patent
Yuan et al.

(10) Patent No.: US 12,346,778 B2
(45) Date of Patent: Jul. 1, 2025

(54) AI-BASED CONDITION CLASSIFICATION SYSTEM FOR PATIENTS WITH NOVEL CORONAVIRUS

(71) Applicant: HUAZHONG UNIVERSITY OF SCIENCE AND TECHNOLOGY, Hubei (CN)

(72) Inventors: Ye Yuan, Hubei (CN); Chuan Sun, Hubei (CN); Li Yan, Hubei (CN); Hui Xu, Hubei (CN); Maolin Wang, Hubei (CN); Yuqi Guo, Hubei (CN); Xiuchuan Tang, Hubei (CN); Haitao Zhang, Hubei (CN); Yang Xiao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 1129 days.

(21) Appl. No.: 17/281,264

(22) PCT Filed: Jul. 29, 2020

(86) PCT No.: PCT/CN2020/105477
§ 371 (c)(1),
(2) Date: Mar. 30, 2021

(87) PCT Pub. No.: WO2021/179514
PCT Pub. Date: Sep. 16, 2021

(65) Prior Publication Data
US 2022/0122739 A1    Apr. 21, 2022

(30) Foreign Application Priority Data
Mar. 7, 2020    (CN) .......................... 202010153914.7

(51) Int. Cl.
*G01N 33/48*    (2006.01)
*G06N 20/00*    (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

2014/0270493 A1    9/2014    Chen et al.

FOREIGN PATENT DOCUMENTS

| CN | 107403072 | 11/2017 |
|----|-----------|---------|
| CN | 109119167 | 1/2019 |
| CN | 109785976 | 5/2019 |
| CN | 110825819 | 2/2020 |

OTHER PUBLICATIONS

Habib, Al-Zadid Sultan Bin, Tanpia Tasnim, and Md Muktadir Billah. "A study on coronary disease prediction using boosting-based ensemble machine learning approaches." 2019 2nd International Conference on Innovation in Engineering and Technology (ICIET). IEEE, 2019.*

Ogunleye, Adeola, and Qing-Guo Wang. "XGBoost model for chronic kidney disease diagnosis." IEEE/ACM transactions on computational biology and bioinformatics 17.6 (2019): 2131-2140.*

"International Search Report (Form PCT/ISA/210) of PCT/CN2020/105477," mailed on Dec. 8, 2020, pp. 1-5.

* cited by examiner

*Primary Examiner* — Anna Skibinsky
(74) *Attorney, Agent, or Firm* — JCIP GLOBAL INC.

(57) ABSTRACT

The disclosure discloses an AI-based condition classification system for patients with novel coronavirus, which includes: a classification model acquisition module for training one or more binary classification models that classify patient conditions according to patient data, and obtain the most accurate binary classification model as the target model, and determine the interpretable features in the patient data; a preprocessing module is configured to extract the interpretable features in the patient data to be classified, and then perform preprocessing on the extracted features to fill in the missing values and replace the abnormal values in the data, so as to obtain the features to be classified after the preprocessing is completed; a condition classification module is configured to use the features to be classified as the input for the target model, and the target model is used to complete condition classification for the patients to be classified.

12 Claims, 5 Drawing Sheets

FIG. 6

AI-BASED CONDITION CLASSIFICATION SYSTEM FOR PATIENTS WITH NOVEL CORONAVIRUS

CROSS-REFERENCE TO RELATED APPLICATION

This application is a 371 of international application of PCT application serial no. PCT/CN2020/105477, filed on Jul. 29, 2020, which claims the priority benefit of China application no. 202010153914.7, filed on Mar. 7, 2020. The entirety of each of the above mentioned patent applications is hereby incorporated by reference herein and made a part of this specification.

BACKGROUND

Field of the Disclosure

The disclosure belongs to the field of condition classification, and more specifically, relates to an AI (artificial intelligence)-based condition classification system for patient with novel coronavirus.

Description of Related Art

The novel coronavirus is a new RNA (ribonucleic acid) virus that was identified in December 2019 and is highly infectious. Patients infected with novel coronavirus have various symptoms. How to anticipate the subsequent changes in the patient conditions serves as a guide for medical staff to take further treatment measures. The current clinically collected patient physical indicators include sixty indicators or more, such as quantitative determination of dimers, thyroid function set (TSH, FT3, FT4), immune set (IgG.IgA.IgM.C3.C4), interleukin, biochemical set, sugar chain antigen, etc. There are many types of indicators, which makes it very difficult for medical staff to anticipate possible development of the patient condition. In the meantime, there is a massive number of patients, and there are tens of thousands of patients whose conditions need to be assessed in details on a weekly or daily basis. At present, medical staff evaluate and classify the patient condition based on indicators combined with subjective judgment of the patient's physical condition. Such classification method has brought a heavy burden to medical staff.

The classification method based on artificial intelligence is a computer-assisted approach to help people make quick and accurate judgments and decisions. The rise of artificial intelligence makes related technical means play a critical role in classification. However, using artificial intelligence to solve the problem of classification of patients with novel coronavirus infection is facing many difficulties.

First of all, the lack of physical indicators from some patients poses a challenge to computer classification. For example, the lactate dehydrogenase indicator is not tested in 10 among the 100 patients, and therefore the classification needs to be performed with high stability. Secondly, there are some abnormal data in the obtained indicators, and the values of which significantly exceed the numeral range of the indicator, and therefore the classification needs to have high robustness. Finally, medical materials contain more positive samples and fewer negative samples, and the imbalance of categories will affect the accuracy of classification. The novel coronavirus is spreading quickly, but there is no classification system with excellent performance for this problem. Therefore, in order to solve the problem of classifying patient condition caused by novel coronavirus infection, it is urgent to provide a classification system that meets the requirements of stability, robustness and accuracy.

SUMMARY OF THE DISCLOSURE

In view of the shortcomings and requirements of improvement in the related art, the disclosure provides an AI (artificial intelligence)-based condition classification system for patients with novel coronavirus. The purpose of the disclosure is to provide a classification system that meets the requirements of stability, robustness and accuracy to solve the problem of classifying patients with novel coronavirus.

In order to achieve the above purpose, the disclosure provides an AI-based condition classification system for patients with novel coronavirus, including: a classification model acquisition module, a preprocessing module, and a condition classification module.

The classification model acquisition module is configured to train one or more binary classification models that classify the patient condition according to the patient data, and obtain the most accurate binary classification model as the target model, and determine the interpretable features in the patient data.

The preprocessing module is configured to extract the interpretable features in the patient data to be classified, and then preprocess the extracted features to fill in the missing values and replace the abnormal values among the extracted features, so as to get the features to be classified after the preprocessing is finished.

The condition classification module is configured to use the features to be classified as the input for the target model, and use the target model to complete the condition classification of the patients to be classified.

The AI-based condition classification system for patients with novel coronavirus provided by the disclosure performs the preprocessing operation, fills in missing values in patient feature data and replaces the abnormal values among the patient feature data, thereby ensuring the stability and robustness of classification. Through training multiple classification models, from which the most accurate model is selected for condition classification, the accuracy of classification can be ensured. In general, the disclosure provides a stable, robust and accurate condition classification system for patients with novel coronavirus, which can effectively solve the problem of classifying the conditions of patients with novel coronavirus.

The AI-based condition classification system for patients with novel coronavirus provided by the disclosure also screens out interpretable features from a large number of feature data, and completes condition classification based on interpretable features, thereby improving the interpretability of the binary classification model, and effectively preventing overfitting and further ensuring the accuracy of classification.

Further, the classification model acquisition module includes: a preprocessing unit, a data set division unit, N model training units, a decision-making unit, and a model retraining unit.

The preprocessing unit is configured to preprocess the medical test data labeled with two types of data to fill in the missing values and replace the abnormal values among the data, so as to obtain the data set after the preprocessing is completed.

The data set dividing unit is configured to divide the data set into training set, validation set and test set according to a preset ratio.

Each of the N model training units is configured to establish a binary classification model that classifies the patient condition according to patient data. After the category weights are set, the training set and the validation set are adopted to train and validate the established binary classification model, and the test set is adopted to evaluate the accuracy of the trained binary classification model. The N binary classification models established by the N model training units are different from each other, and each of the binary classification models outputs feature importance after the training is completed.

The decision-making unit is configured to select the most accurate binary classification model from the N trained binary classification models as the candidate model, and select the top K features with the highest feature importance as the interpretable features according to the feature importance output by the candidate model.

The model retraining unit is configured to eliminate features other than the interpretable features in the training set and validation set, and adopt the new training set and the new validation set to train and validate the candidate model, so that after the training is completed, the optimal binary classification model is obtained and adopted as the target model.

Specifically, N and K are both positive integers.

In the AI-based condition classification system for patient with novel coronavirus provided by the disclosure, when the classification model acquisition module obtains the target model, the medical test data labeled with two types of data are adopted to strictly train, validate and test multiple binary classification models, so as to select the model with the highest accuracy, thereby ensuring that the classification performance of the classification model is optimal.

Interpretability is a major issue that must be encountered in the intersecting field of AI+medicine, especially considering that in actual clinical practice, a small number of patients may have abnormal conditions. If the model has not learned such conditions before, the judgment made based on the model will be unreliable. Interpretable model facilitates medical staff to analyze such situations and make more scientific and reasonable judgments. In addition, the test equipment and other factors will cause the test indicators to be involved with some interference and noise. Even if an uninterpretable model is overfitted on the noise, the designer will not be able to be sure about that. An interpretable model can determine whether overfitting has occurred through analysis. In the AI-based condition classification system for patient with novel coronavirus provided by the disclosure, the classification model acquisition module can improve the interpretability of the selected model and prevent overfitting by analyzing the feature importance.

In AI-based condition classification system for patient with novel coronavirus provided by the disclosure, the model training unit will first set the category weight before using the training set to train the binary classification model, so that in the model training process, a larger category weight is put on a smaller number of categories and a smaller category weight is put on a larger number of categories, thereby reducing the influence brought by imbalance of the categories, and improving accuracy of classification.

Furthermore, each model training unit adopts M-fold cross-validation when training and validating the binary classification model, wherein M is a positive integer. Through cross-validation, random factors can be eliminated, the reliability of the classification results can be improved, and a reliable basis is provided for selecting the optimal binary classification model.

Further, M-fold cross-validation is M-fold hierarchical cross-validation, and the proportion of the two types of data in each fold cross-validation is the same to further improve the credibility of the classification results of the model.

Further, accuracy is evaluated based on accuracy rate and F1-score, and the priority of accuracy rate is higher than F1-score.

When evaluating the accuracy of the model, the disclosure takes accuracy rate and F1-score both into consideration, and accuracy rate is prioritized higher, so as to comprehensively reflect the overall performance of the model.

Further, N=5, and the binary classification models established by 5 model training units are: XGBoost, LightGBM, random forest, CatBoost and logistic regression.

Further, the classification model acquisition module further includes: a feature visualization unit.

The feature visualization unit is configured to visualize the interpretable features selected by the decision-making unit.

The disclosure can further improve the interpretability of the model and prevent overfitting by visualizing the interpretable features.

Further, the preprocessing operation includes the followings.

The default fill value x is adopted to fill in the missing data.

For each feature, if the feature value is greater than the value of the H-th percentile or less than the value of the L-th percentile of the feature, it is determined whether the feature value is an abnormal value according to an error detection criterion, and when it is determined that the feature value is the abnormal value, the feature value is replaced with the preset replacement value y.

Specifically, L and H are both positive integers, and $0<L<H<100$.

Further, the error detection criterion adopts the $3\sigma$ rule.

Further, the AI-based condition classification system for patients with novel coronavirus provided by the disclosure further includes: an interactive module.

The interactive module is configured to input patient data to be classified, and visually display the results of condition classification.

In general, through the above technical solutions conceived in the disclosure, the following advantageous effects can be achieved.

(1) The disclosure fills in missing values in patient feature data and replaces abnormal values through preprocessing operations, ensuring the stability and robustness of classification. By training multiple classification models and selecting the most accurate model to classify conditions, the accuracy of the classification can be ensured. In general, the disclosure provides a stable, robust and accurate AI-based condition classification system for patients with novel coronavirus, which can effectively solve the problem of classifying conditions of patients with novel coronavirus.

(2) The disclosure selects interpretable features from a large number of feature data, and completes condition classification only for interpretable features, thereby improving the interpretability of the binary classification model, effectively preventing overfitting, and further ensuring accuracy of classification. The disclosure can further improve the interpretability of the model and prevent overfitting by visualizing the interpretable features.

(3) The disclosure will perform cross-validation during model training, thereby eliminating random factors, improving the reliability of the classification results, and providing a reliable basis for selecting the optimal binary classification model.

(4) In the disclosure, before using the training set to train the binary classification model, the category weights are set first, which can reduce the influence brought by category imbalance and improve the accuracy of classification.

BRIEF DESCRIPTION OF THE DRAWINGS

FIG. 6 is a schematic diagram of an interactive module provided in an embodiment of the disclosure.

DESCRIPTION OF EMBODIMENTS

In order to make the objectives, technical solutions and advantages of the disclosure clearer, the following further describes the disclosure in detail with reference to the accompanying drawings and embodiments. It should be understood that the specific embodiments described here are only used to explain the disclosure, but not to limit the disclosure. In addition, the technical features involved in the various embodiments of the disclosure described below can be combined with each other as long as they do not conflict with each other.

In the disclosure, the terms "first", "second", etc. (if any) in the present disclosure and the accompanying drawings are used to distinguish similar objects, and are not necessarily used to describe a specific sequence or order.

Figure 1:
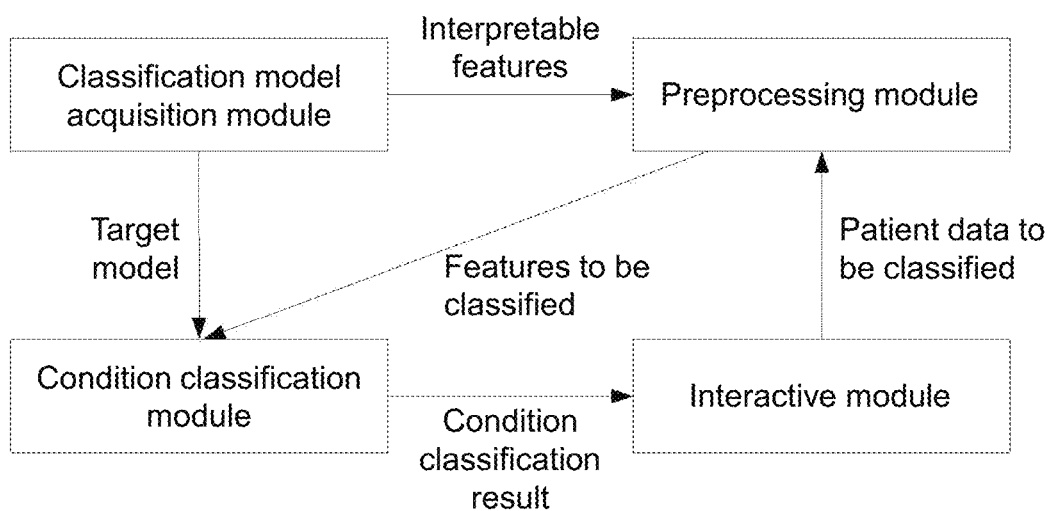
FIG. 1 is a schematic diagram of an AI-based condition classification system for patients with novel coronavirus provided in an embodiment of the disclosure.

In order to improve the stability, robustness and accuracy in the condition classification for patients with novel coronavirus, the disclosure provides an AI-based condition classification system for patient with novel coronavirus, which as shown in FIG. 1 includes a classification model acquisition module, a preprocessing module, and a condition classification module.

The classification model acquisition module is configured to train one or more binary classification models that classify the patient conditions according to the patient data, and obtain the most accurate binary classification model as the target model, and determine the interpretable features in the patient data. The patient data includes multiple features, such as "age", "average RBC volume", "albumin", "total protein", etc. From a medical perspective, only some of all features are closely associated with the patient condition. The key features closely associated with the condition are the interpretable features.

The preprocessing module is configured to extract the interpretable features in the patient data to be classified, and then preprocess the extracted features to fill in the missing values and replace the abnormal values among the extracted features, so as to get the features to be classified after the preprocessing is finished.

The condition classification module is configured to use the features to be classified as the input for the target model, and use the target model to complete the condition classification of the patients to be classified.

The AI-based condition classification system for patients with novel coronavirus performs the preprocessing operation, fills in missing values in patient feature data and replaces the abnormal values among the patient feature data, thereby ensuring the stability and robustness of classification. Through training multiple classification models, from which the most accurate model is selected for condition classification, the accuracy of classification can be ensured. In general, the above AI-based condition classification system for patients with novel coronavirus provides a stable, robust and accurate condition classification system for patients with novel coronavirus, which can effectively solve the problem of classifying the conditions of patients with novel coronavirus. In the meantime, the above AI-based condition classification system for patients with novel coronavirus also screens out interpretable features from a large number of feature data, and completes condition classification based on interpretable features, thereby improving the interpretability of the binary classification model, and effectively preventing overfitting and further ensuring the accuracy of classification.

Figure 2:
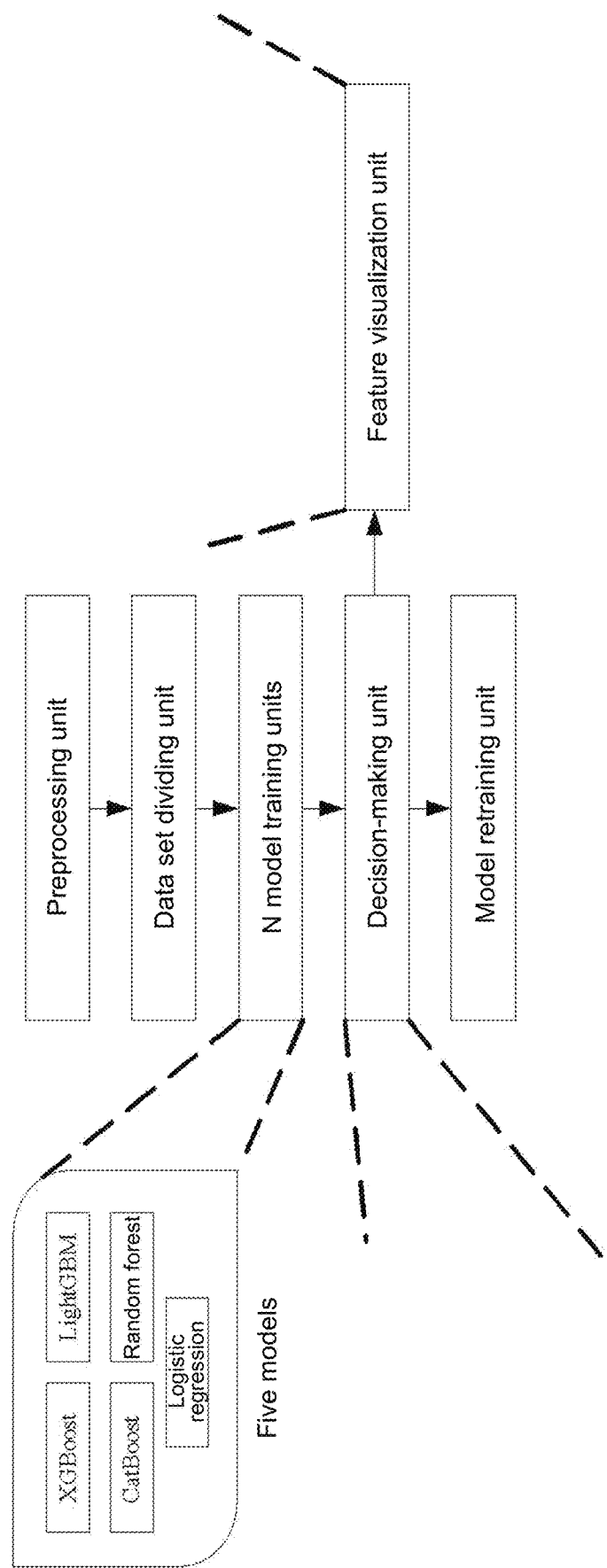
FIG. 2 is a schematic diagram of a classification model acquisition module provided in an embodiment of the disclosure.

In the embodiment, as shown in FIG. 2, the classification model acquisition module includes: a preprocessing unit, a data set division unit, N model training units, a decision-making unit, and a model retraining unit.

The preprocessing unit is configured to preprocess the medical test data labeled with two types of data to fill in the missing values and replace the abnormal values among the data, so as to obtain the data set after the preprocessing is completed.

The data set dividing unit is configured to divide the data set into training set, validation set and test set according to a preset ratio.

Each of the N model training units is configured to establish a binary classification model that classifies the patient condition according to patient data. After the category weights are set, the training set and the validation set are adopted to train and validate the established binary classification model, and the test set is adopted to evaluate the accuracy of the trained binary classification model. The N binary classification models established by the N model training units are different from each other, and each of the binary classification models outputs feature importance after the training is completed.

The decision-making unit is configured to select the most accurate binary classification model from the N trained binary classification models as the candidate model, and select the top K features with the highest feature importance as the interpretable features according to the feature importance output by the candidate model.

The model retraining unit is configured to eliminate features other than the interpretable features in the training set and validation set, and adopt the new training set and the new validation set to train and validate the candidate model, so that after the training is completed, the optimal binary classification model is obtained and adopted as the target model.

Specifically, N and K are both positive integers. The cross-validation fold number K should be determined according to actual situation based on comprehensive consideration of the number of training set samples and training duration. The larger the value K is set, the larger the number of training samples, but the corresponding training time length is longer. On the contrary, the smaller the value K is set, the shorter the training time length, but the number of corresponding training samples is less. Typically, the value range of K is 3≤K≤10.

In an optional embodiment, each model training unit adopts M-fold cross-validation when training and validating the binary classification model, wherein M is a positive integer. Through cross-validation, random factors can be eliminated, the reliability of the classification results can be improved, and a reliable basis is provided for selecting the optimal binary classification model.

As a more preferable embodiment, M-fold cross-validation is M-fold hierarchical cross-validation, and the proportion of the two types of data in each fold cross-validation is the same to further improve the credibility of the classification results of the model.

As an optional embodiment, in the embodiment, N=5, and the binary classification models established by 5 model training units are: XGBoost, LightGBM, random forest, CatBoost and logistic regression. Accuracy is evaluated based on accuracy rate and F1-score, and the priority of accuracy rate is higher than F1-score, that is, the model with higher accuracy rate is selected first. In the case where the accuracy rates of models are the same, the model with high F1-score is selected; the calculation formulas for accuracy rate and F1-score are as follows:

$$\text{accuracy} = \frac{TP + TN}{TP + TN + FP + FN} \times 100\%$$

$$F1 - \text{score} = 2 \cdot \frac{\text{precision} * \text{recall}}{\text{precision} + \text{recall}}$$

In the formulas, TP, FP, FN and TN respectively represent the number of true positives, false positives, false negatives and true negatives; precision represents the precision rate, recall represents the recall rate, and the corresponding calculation formulas are as follows:

$$\text{precision} = \frac{TP}{TP + FP}$$

$$\text{recall} = \frac{TP}{TP + FN}$$

In this embodiment, the validation method adopted is specifically 4-fold hierarchical cross-validation, and the proportion of the two types of data in each fold cross-validation is the same.

Figure 3:
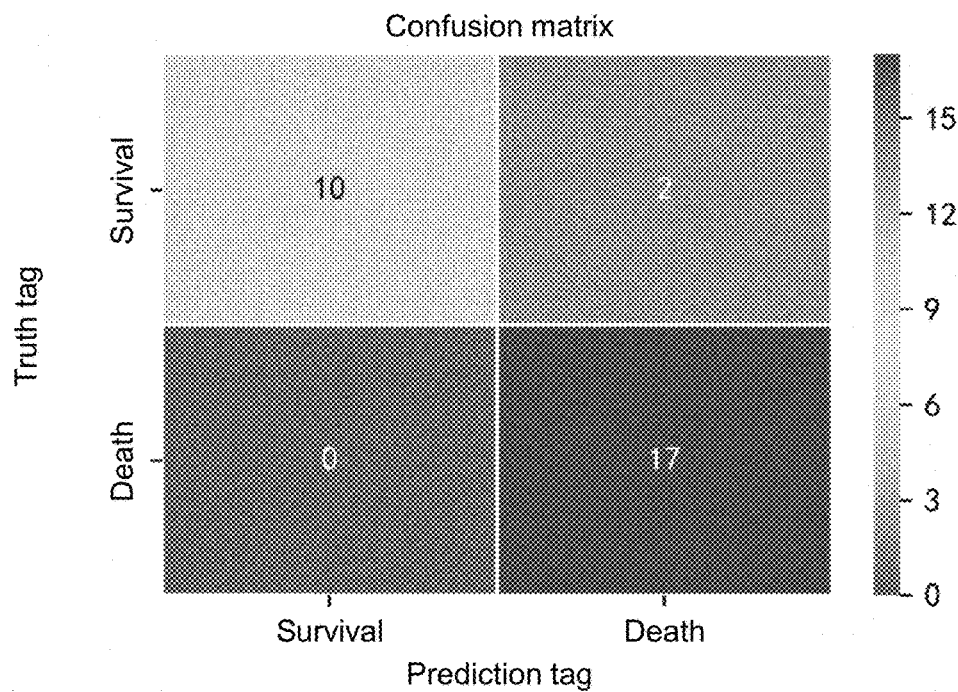
FIG. 3 is a confusion matrix of XGBoost prediction results on the test set provided in an embodiment of the disclosure.
Figure 4:
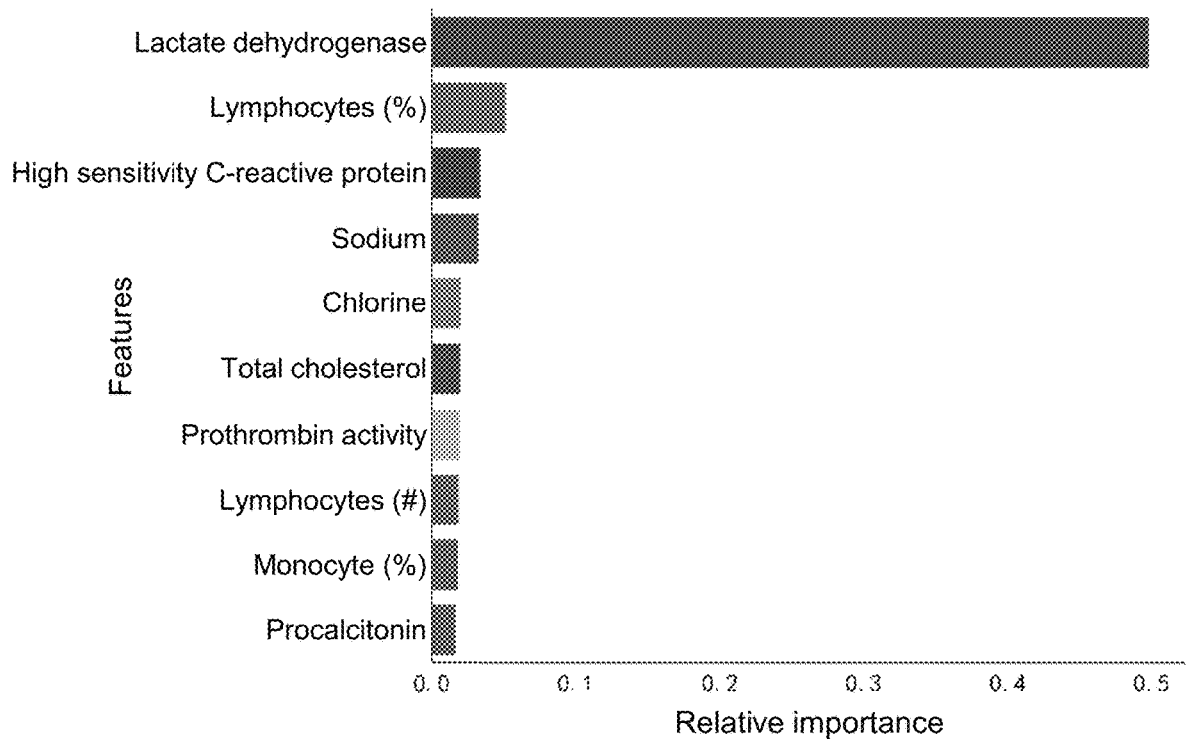
FIG. 4 is a schematic diagram of feature importance provided in an embodiment of the disclosure.

Finally, in this embodiment, the binary classification model with the highest accuracy selected by the decision-making unit is XGBoost. The confusion matrix of the prediction results on the test set is shown in FIG. 3. Each column represents the prediction category, and the total number in each column represents the number of data predicted to be in the category. Each row represents the true attribution category of the data, and the total number of data in each row represents the number of data instances of the category. The value in each column represents the number of real data predicted to be in the category. Here, the first column represents the classification result as cured, the second column represents the classification result as death, the first row represents the true label as cured, and the second row represents the true label as death. The confusion matrix shown in FIG. 3 well reflects the accuracy of XGboost classification. In this embodiment, the feature importance output by XGBoost is shown in FIG. 4. The decision-making unit selects Lactate dehydrogenase, High-sensitivity C-reactive protein and Lymphocyte (%) from all features as interpretable features according to feature importance.

In the embodiment, when the classification model acquisition module obtains the target model, the medical test data labeled with two types of data are adopted to strictly train, validate and test multiple binary classification models, so as to select the model with the highest accuracy, thereby ensuring that the classification performance of the classification model is optimal. In this embodiment, the two types of data tags marked are adopted to indicate the cure and death of the patient, and they serve to guide medical staff to perform the next treatment. If the patient condition is classified as death, it means that the patient is in critical condition and faces the danger of death; if the patient condition is classified as cured, it means that the patient condition is developing in the direction of cure. By analyzing the feature importance, the interpretability of the selected model can be improved, thereby preventing overfitting. Setting the category weight before model training can reduce the influence brought by imbalance of the categories, thereby improving accuracy of classification. It should be noted that the setting of related parameters in this embodiment is only an exemplary description and should not be construed as the only limitation to the disclosure.

As shown in FIG. 2, in order to further improve the interpretability of the model and prevent overfitting, in this embodiment, the classification model acquisition module further includes: a feature visualization unit.

The feature visualization unit is configured to visualize the interpretable features selected by the decision-making unit.

Figure 5:
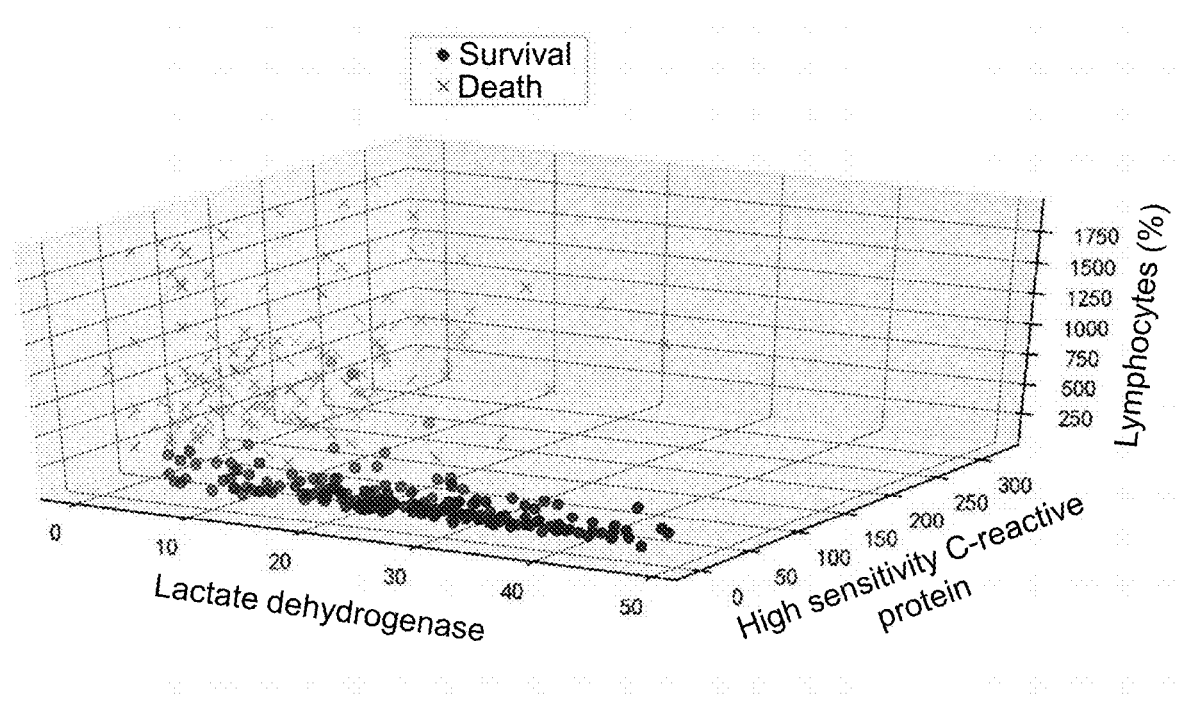
FIG. 5 is a three-dimensional scatter plot of interpretable features provided in an embodiment of the disclosure.

In this embodiment, the three interpretable features that have been selected are visualized in the form of a three-dimensional scatter plot, and the result is shown in FIG. 5. Likewise, the visualization operation here is only exemplary and should not be construed as the only limitation to the disclosure. Other visualization methods for improving the interpretability of the model are also applicable to the disclosure.

In an optional embodiment, the preprocessing operations (the preprocessing operation performed by the preprocessing module on the patient data to be classified, and the preprocessing operation performed by the preprocessing unit on the medical test data labeled with two types of data) include followings.

The default fill value x is adopted to fill in the missing data.

For each feature, if the feature value is greater than the value of the H-th percentile or less than the value of the L-th percentile of the feature, it is determined whether the feature value is an abnormal value according to an error detection criterion, and when it is determined that the feature value is an abnormal value, the feature value is replaced with the preset replacement value y.

Specifically, L and H are both positive integers, and 0<L<H<100. L and H respectively correspond to the lower and upper limits of the normal range of feature values, which can be determined according to the value of the feature data of the patients with novel coronavirus. In this embodiment, x=y=−1, L=1, H=99.

As an optional embodiment, the error detection criterion is the 3σ rule; specifically, the determining method based on 3σ rule is as follows.

a) The standard deviation σ of a single feature is calculated.

b) The absolute value of the difference between the feature value of each sample and the mean $\bar{X}$ is compared with 3 times the standard deviation σ, if the absolute value is greater than 3 times the standard deviation, the absolute value will be identified as an abnormal value and eliminated.

$$|x_i - \bar{x}| > 3\sqrt{\frac{(x_1 - \bar{x})^2 + (x_2 - \bar{x})^2 + \ldots + (x_n - \bar{x})^2}{n - 1}}$$

c) Step b) is repeated until no further abnormal value is eliminated in this loop.

In the formula, n represents the total number of samples, and $x_i$ represents the feature value of the feature in the i-th sample. It should be noted that other error detection criteria can also be applied to the disclosure.

Further, in order to improve the interpretability of the system, the AI-based condition classification system for patients with novel coronavirus provided by the disclosure, as shown in FIG. 1, further includes: an interactive module.

The interactive module is configured to input patient data to be classified and visually display the classification result of the condition.

Figure 6:
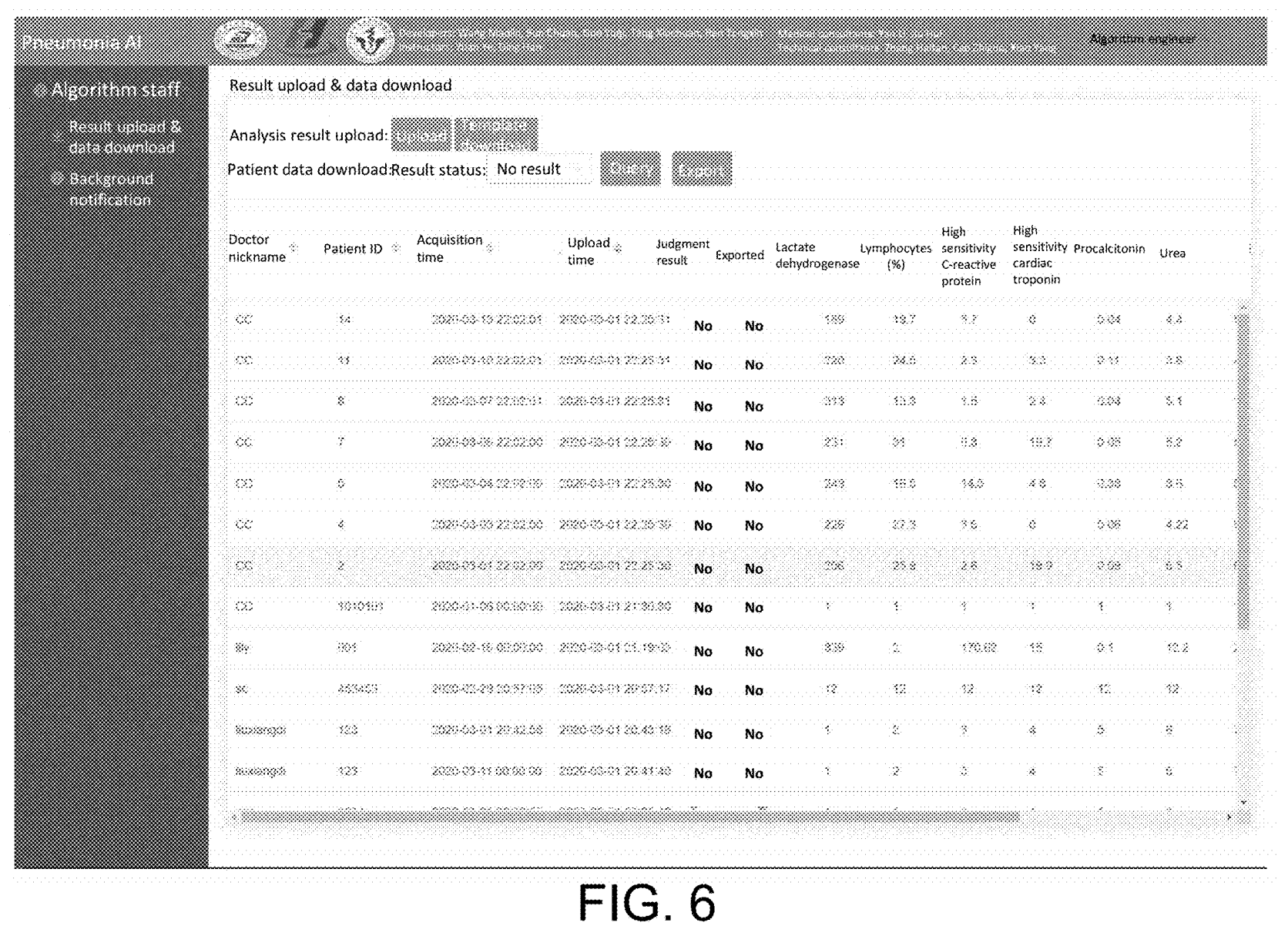

FIG. 6 shows a schematic diagram of the implementation of the interactive module in this embodiment at the software level. Through this module, the data of patient with novel coronavirus is uploaded to get the classification result of the condition, and the data can be exported with one click, which is convenient for medical staff to exchange information.

It is easy for those skilled in the art to understand that the above descriptions are only preferred embodiments of the disclosure, which are only used to help understand the disclosure and are not used to limit the disclosure. Any modification, equivalent substitution and improvement made within the spirit and principle of the disclosure should fall within the protection scope of the disclosure.

What is claimed is:

1. An AI (artificial intelligence)-based condition classification system for patients with novel coronavirus, characterized in comprising: a classification model acquisition module, a preprocessing module, and a condition classification module;

wherein the classification model acquisition module is configured to train a plurality of binary classification models that classify a patient condition according to a patient data, and obtain one binary classification model with a highest accuracy from the binary classification models as a target model, and determine interpretable features in the patient data;

the preprocessing module is configured to extract the interpretable features in patient data to be classified, and then perform a preprocessing operation on the extracted interpretable features to fill in a missing value and replace an abnormal value among the extracted features, so as to get features to be classified after the preprocessing operation is finished;

the condition classification module is configured to use the features to be classified as inputs for the target model, and use the target model to complete a condition classification of the patient data to be classified, wherein the classification model acquisition module comprises:

a preprocessing unit, configured to preprocess medical test data labeled with two types of data to fill in the missing value and replace the abnormal value among the data, so as to obtain a data set after preprocessing of medical test data labeled with the two types of data is completed;

a data set dividing unit, configured to divide the data set into a training set, a validation set and a test set according to a preset ratio;

each of N model training units, configured to establish each of the binary classification models that classifies the patient condition according to the patient data, set category weights, adopt the training set and the validation set to train and validate the each of the binary classification models after the category weights are set, and adopt the test set to evaluate an accuracy of each of the binary classification models after training; wherein N binary classification models established by the N model training units are different from each other, and each of the binary classification models outputs a plurality of feature importance after completing training;

a decision-making unit, configured to select one binary classification model with the highest accuracy from the N trained binary classification models as a candidate model, and select top K features with highest feature importance as the interpretable features according to the plurality of feature importance output by the candidate model;

a model retraining unit, configured to eliminate features other than the interpretable features in the training set and the validation set to obtain a new training set and a new verification set respectively, and adopt the new training set and the new validation set to retrain and revalidate the candidate model, so that after the candidate model is retrained, an optimal binary classification model is obtained and adopted as the target model; wherein N and K are both positive integers.

2. The AI-based condition classification system for patients with novel coronavirus according to claim 1, wherein each of the model training units adopts M-fold cross-validation when training and validating each of the binary classification models;

wherein M is a positive integer.

3. The AI-based condition classification system for patients with novel coronavirus according to claim 2, wherein the M-fold cross-validation is M-fold hierarchical cross-validation, and a proportion of two types of the medical test data labeled with the two types of data in each fold cross-validation is the same.

4. The AI-based condition classification system for patients with novel coronavirus according to claim 1, wherein the accuracy is evaluated based on accuracy rate and F1-score, and a priority of the accuracy rate is higher than the F1-score.

5. The AI-based condition classification system for patients with novel coronavirus according to claim 1, wherein N=5, and the binary classification models established by the 5 model training units are: XGBoost, LightGBM, random forest, CatBoost and logistic regression.

6. The AI-based condition classification system for patients with novel coronavirus according to claim 1, wherein the classification model acquisition module further comprises a feature visualization unit;

wherein the feature visualization unit is configured to visualize the interpretable features selected by the decision-making unit.

7. The AI-based condition classification system for patients with novel coronavirus according to claim 1, wherein the preprocessing operation comprises:
   using a default fill value x to fill in the missing value;
   for each of the interpretable features, if a feature value is greater than a value of a H-th percentile or less than a value of a L-th percentile of the interpretable feature, determining whether the feature value is an abnormal value according to an error detection criterion, and when it is determined that the feature value is the abnormal value, replacing the feature value with a preset replacement value y;
   wherein L and H are both positive integers, and $0<L<H<100$.

8. The AI-based condition classification system for patients with novel coronavirus according to claim 7, wherein the error detection criterion adopts a 3σ rule.

9. The AI-based condition classification system for patients with novel coronavirus according to claim 1, further comprising an interactive module;
   wherein the interactive module is configured to input the patient data to be classified, and visually display a result of condition classification.

10. The AI-based condition classification system for patients with novel coronavirus according to claim 1, wherein the preprocessing operation comprises:
    using a default fill value x to fill in the missing value;
    for each of the interpretable features, if a feature value is greater than a value of a H-th percentile or less than a value of a L-th percentile of the interpretable feature, determining whether the feature value is an abnormal value according to an error detection criterion, and when it is determined that the feature value is the abnormal value, replacing the feature value with a preset replacement value y;
    wherein L and H are both positive integers, and $0<L<H<100$.

11. The AI-based condition classification system for patients with novel coronavirus according to claim 10, wherein the error detection criterion adopts a 3σ rule.

12. The AI-based condition classification system for patients with novel coronavirus according to claim 1, further comprising an interactive module;
    wherein the interactive module is configured to input the patient data to be classified, and visually display a result of condition classification.

* * * * *